United States Patent
Yamasaki et al.

(10) Patent No.: US 10,241,935 B2
(45) Date of Patent: Mar. 26, 2019

(54) PORTABLE DEVICE, CABLE ASSEMBLY, AND USB SYSTEM

(71) Applicant: Lenovo (Singapore) Pte. Ltd., Singapore (SG)

(72) Inventors: Noritoshi Yamasaki, Tokyo (JP); Takeshi Migita, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 485 days.

(21) Appl. No.: 14/751,348

(22) Filed: Jun. 26, 2015

(65) Prior Publication Data

US 2016/0004650 A1    Jan. 7, 2016

(30) Foreign Application Priority Data

Jul. 2, 2014  (JP) .................................. 2014-136467

(51) Int. Cl.
*G06F 13/10*  (2006.01)
*G06F 1/26*   (2006.01)

(52) U.S. Cl.
CPC ............ *G06F 13/102* (2013.01); *G06F 1/266* (2013.01)

(58) Field of Classification Search
CPC ................................ G06F 1/266; G06F 13/102
See application file for complete search history.

(56) References Cited

U.S. PATENT DOCUMENTS

| | | | | |
|---|---|---|---|---|
| 7,528,576 | B2* | 5/2009 | Ukon ................. | G01R 31/3648 320/132 |
| 2010/0064153 | A1* | 3/2010 | Gk .......................... | G06F 1/266 713/310 |
| 2010/0169534 | A1* | 7/2010 | Saarinen ............... | G06F 13/385 710/316 |
| 2010/0228893 | A1* | 9/2010 | Hung ................... | G06F 13/4068 710/16 |
| 2014/0103868 | A1* | 4/2014 | Gilbert ................. | H02J 7/0044 320/108 |

FOREIGN PATENT DOCUMENTS

| | | |
|---|---|---|
| CN | 102340162 A | 2/2012 |
| JP | 2000357029 A | 12/2000 |
| JP | 2001306413 A | 11/2001 |
| JP | 2003061256 A | 2/2003 |

(Continued)

OTHER PUBLICATIONS

Mark Lai et al., "Battery Charging Specification", Revision 1.2, USB Implementers Forum, Inc., Dec. 7, 2010, 71 pages.

(Continued)

*Primary Examiner* — Henry Tsai
*Assistant Examiner* — John B Roche
(74) *Attorney, Agent, or Firm* — Ference & Associates LLC

(57) ABSTRACT

One aspect includes a system, including: a portable device having a receptacle; and a cable assembly including a plug connectable to the receptacle; the cable assembly including: a first connection for a peripheral device; a second connection for a charger; and a control section that indicates a charging mode to the portable device permitting connection of both the charger and the peripheral device to the portable device. Other aspects are described and claimed.

20 Claims, 6 Drawing Sheets

(56) References Cited

FOREIGN PATENT DOCUMENTS

| | | |
|---|---|---|
| JP | 2005025405 A | 1/2005 |
| JP | 2006099354 A | 4/2006 |
| JP | 2008158840 A | 7/2008 |
| JP | 2010009208 A | 1/2010 |
| JP | 2012502354 A | 1/2012 |
| JP | 2013109518 A | 6/2013 |
| JP | 2014003889 A | 1/2014 |

OTHER PUBLICATIONS

Jerry Kuo et al., "On-The-Go and Embedded Host Supplement to the USB Revision 2.0 Specification", Revision 2.0, Universial Serial Bus Specification Supplemental, May 8, 2009, 79 pages.
Jing Wang et al., "On-The-Go an Embedded Host Supplement to the USB Revision 3.0 Specification", Revision 1.0, Universal Serial Bus Specification Supplement, Jul. 1, 2011, 72 pages.

* cited by examiner

PORTABLE DEVICE, CABLE ASSEMBLY, AND USB SYSTEM

CLAIM FOR PRIORITY

This application claims priority from Japanese Patent Application No. 2014-136467, filed on Jul. 2, 2014, and which is fully incorporated by reference as if fully set forth herein.

FIELD

The subject matter described herein relates to a technique for a portable device to communicate with another device while charging an internal battery through one connector, and further to a ganged operation between an adapter for a portable device and the portable device to perform charging and communication at the same time.

BACKGROUND

There is USB as one of computer interfaces for connecting a host device and a peripheral device. In the USB, a USB controller housed in the host device (also called a master) and the peripheral device (also called a target, a function, or simply a device) are connected in a one-to-one relationship or through a hub. The host device includes, as hardware, a route hub and one or more USB ports (receptacles) connected to the route hub, and as software, an OS and device drivers for bus management and data communication with the peripheral device.

Data transfer between the host device and the peripheral device is performed in such a host and target relationship that only the host device can start the data transfer and the peripheral device returns, to the host device, data corresponding to a request from the host device. The host device is generally a computer, and peripheral devices include a USB memory, a hard disk drive, a keyboard, a mouse, a printer, a digital camera, an audio device, and the like. A USB 2.0 line is made up of a pair of differential data lines (D±), a power line (VBUS), and a ground line (GND). As for a USB 3.0 line, two pairs of differential data lines (Tx±, Rx±) are added to these lines.

For such host/target type USB communication, On-The-Go and Embedded Host Supplement to the USB Revision 2.0 Specification and On-The-Go and Embedded Host Supplement to the USB Revision 3.0 Specification define USB_OTG (USB On-the-Go) that allows any device other than a personal computer (PC), such as a tablet terminal or a smartphone, to act as both a host device and a peripheral device. An OTG device that complies with the USB_OTG specifications is also called a dual-role device in the sense of including both the functions of the host device and the peripheral device.

When the host device is a portable device equipped with a rechargeable battery, such as a smartphone or a tablet terminal, the battery can be charged through a VBUS line with a USB charger directly connected to a receptacle. When the portable device is an OTG device, it is suitable for downsizing because usually only one micro-AB receptacle has to be equipped therein. However, since only either the USB charger or a peripheral device can be connected, charging and communication cannot be performed at the same time. Therefore, a special device is required to use a peripheral device while charging the portable device at the office or at home.

USB Battery Charging Specification Revision 1.2 defines a standard-ACA (Standard Accessory Charger Adapter) for connecting the USB charger and an accessory to a micro-AB receptacle of the portable device (OTG device) at the same time. A standard-ACA 10 shown in FIG. 6 is equipped with a micro-A plug for connection to a portable device 11 and a standard-A receptacle for connection to an accessory 13. The standard-ACA includes a charger switch 19 and an adapter controller 21. The adapter controller 21 declares either a ground state or a floating state to the portable device 11 through an ID_OTG line.

The portable device 11 detects the electric potential of the ID_OTG line to determine an operating mode. When the portable device 11, the accessory 13, and a USB charger 15 are connected to the standard-ACA at the same time, the USB charger outputs voltage to the VBUS line. The portable device 11 can charge an internal battery with power supplied from the VBUS line, and the accessory 13 can operate with the power supplied from the VBUS line. Aside from the standard-ACA, an OTG cable equipped with a micro-A plug for connection to the OTG device, a micro-B receptacle for connecting the USB charger, and a standard-B receptacle for connecting a peripheral device is commercially available. In the OTG cable, the VBUS line to be connected to the OTG device branches for the USB charger and the peripheral device.

Japanese Patent Application Publication No. 2001-306413 discloses a USB cable device for connecting a host device equipped with two USB ports and a peripheral device. The USB cable device connects a two-port VBUS line, to be connected to the host device, through a diode to supplement power from the other port, where the power from one port is insufficient to be supplied to the peripheral device. Japanese Patent Application Publication No. 2012-502354 discloses power control of an OTG device acting as either a host device or a peripheral device.

The OTG device receives either of a host signal HST and a peripheral signal PER from a circuit mechanism for detecting a USB operating mode to determine the operating mode. When the peripheral signal PER is asserted, the OTG device transitions to a peripheral mode. In the peripheral mode, a USB transceiver of the OTG device receives the supply of power through VBUS from a host device connected to a USB port. At this time, power is supplied from a battery to a non-USB circuit mechanism of the OTG device.

When the host signal HST is asserted, the OTG device transitions to a charging mode for charging the capacitance of the VBUS line, and when voltage on the VBUS line rises, the OTG device transitions to a host mode. In the host mode, the battery supplies power to the non-USB circuit mechanism and further supplies power to a receiver of the peripheral device through the VBUS line. Japanese Patent Application Publication No. 2000-357029 discloses a charging device for a portable telephone set. The portable telephone set includes a communication/power connector capable of being commonly used for communication and power supply, and a charging terminal part to be connected to a dedicated charger. A communication interface device inserted between a PC and the portable telephone set is connected to the communication/power connector through a cable including a power line and a signal line to be connected to the portable telephone set.

BRIEF SUMMARY

In summary, one aspect provides a system comprising: a portable device having a receptacle; and a cable assembly including a plug connectable to the receptacle; the cable assembly including: a first connection for a peripheral device; a second connection for a charger; and a control section that indicates a charging mode to the portable device permitting connection of both the charger and the peripheral device to the portable device.

Another aspect provides a cable assembly, comprising: a first connection for a peripheral device; a second connection for a charger; and a control section that indicates a charging mode to a portable device permitting connection of both the charger and the peripheral device to the portable device.

A further aspect provides a method, comprising: detecting, at a cable assembly, connection of a portable device; and indicating, using the cable assembly, a charging mode to the portable device permitting connection of both a charger and a peripheral device to the portable device via the cable assembly.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims

DETAILED DESCRIPTION

Figure 1:
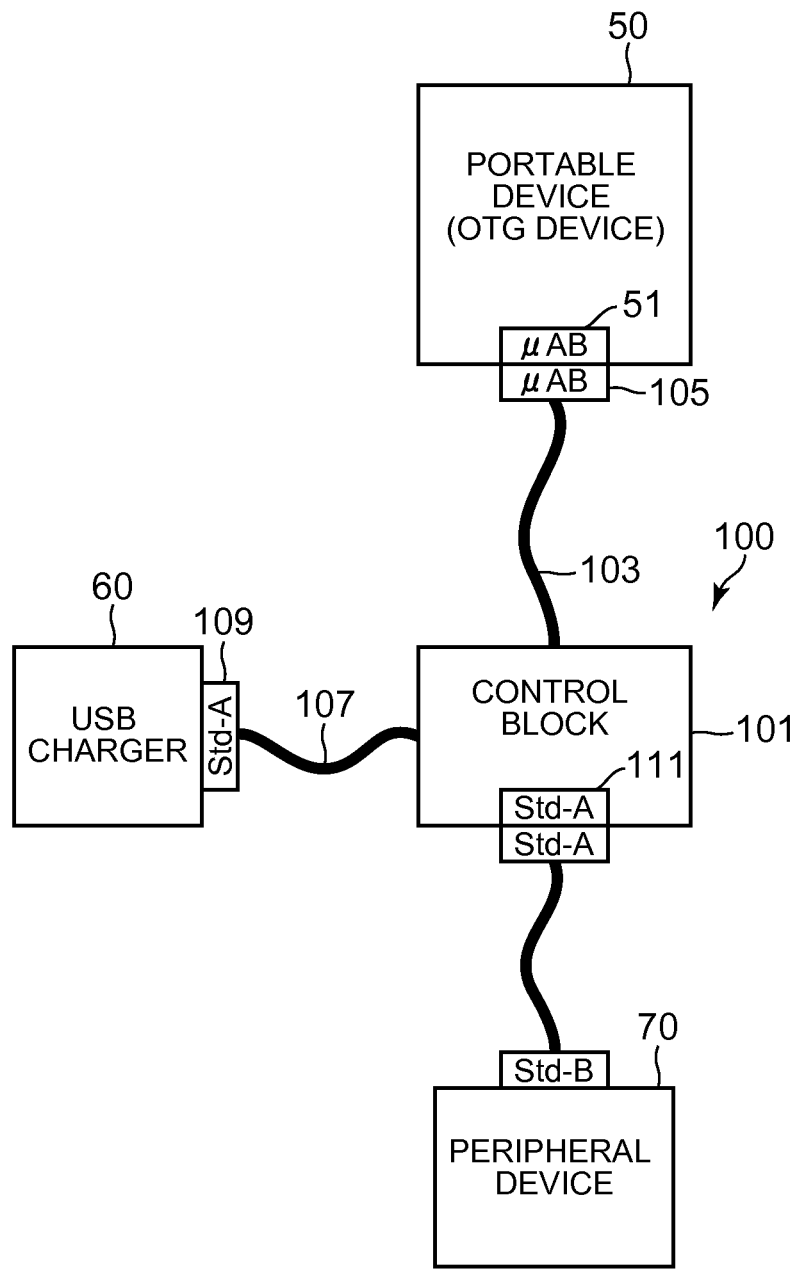
FIG. 1 is a diagram for describing a state in which a portable device is connected with a USB charger and a peripheral device using a cable assembly.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Since a commercially available OTG cable includes three USB connectors, the entire OTG cable transitions to various operating states depending on the order of connections of devices to each other. When the OTG cable with a USB charger connected is connected to a portable device, since the portable device detects voltage on a VBUS line supplied from the USB charger and then detects the electric potential of an ID line, power is not supplied to the VBUS line. However, when only the OTG cable is first connected to the portable device, the portable device detects the electric potential (ground state) of an ID pin of a micro-A plug and outputs voltage to the VBUS line to act as a host device.

After that, when the USB charger is connected to the OTG cable, the voltage of the USB charger overlaps or collides with the voltage of the portable device on the VBUS line, and this may affect the system operation. Even when the USB charger is removed and inserted after the devices are once connected in the correct order, since the voltages overlap on the VBUS line as well, a user is always required to pay attention to the order of connections. As in Japanese Patent Application Publication No. 2001-306413, if a diode is inserted in the VBUS line, the backflow of current from another port to the port concerned can be prevented, but charging current cannot be supplied to the portable device through the port concerned.

Since the standard-ACA described in USB Battery Charging Specification Revision 1.2 is connected to the portable device 11 through the micro-A plug, the portable device 11 always acts as an A device (host device). Further, there is a need to add, to the micro-A plug, a pin for an ID_OTG line connected to the adapter controller 21 separately from the ID pin connected to the ground. Although any device other than the standard-ACA is also connected to the micro-AB receptacle of the portable device 11, the portable device 11 cannot recognize the device to be connected before the connection. The portable device that detected the electric potential (ground state) of the ID pin of the micro-A plug acts as a host device to output voltage to the VBUS line.

To prevent a voltage collision on the VBUS line like that caused in the OTG cable commercially available, the structure of the portable device 11 is complicated. Particularly, when the USB charger is removed and hence the voltage on the VBUS line disappears, voltage is output to the VBUS line in the normal operation of the portable device with the micro-A plug connected thereto. Therefore, when the USB charger 15 is reconnected after that, there is a need to prevent the voltage collision. It is also desired that the portable device 11 can perform charging and communication at the same time while changing the USB controller as little as possible. It is further desired that a cable assembly that enables charging and communication can be manufactured with a simple structure without including a device like the adapter controller 21, and an available USB charger 15 can also be selected from existing USB chargers on a flexible basis.

An embodiment has been made in view of the above circumstances, and provides a cable assembly that enables a portable device to perform USB communication with another device while charging an internal battery through one receptacle.

Another embodiment is characterized by a cable assembly that prevents a voltage collision from occurring on a VBUS line regardless of the order of connections.

Another embodiment is characterized by a simply-structured cable assembly.

Another embodiment is characterized by a cable assembly that can be realized without making any change to a USB controller of a portable device.

Another embodiment is characterized by a portable device operating in conjunction with such a cable assembly.

Another embodiment is characterized by a USB system composed of a portable device and a cable assembly, and a method for the portable device and a peripheral device to perform charging and communication at the same time in such a USB system.

An embodiment is characterized by connecting a plug of a cable assembly to a USB receptacle of a portable device equipped with a battery, where the plug of the cable assembly includes a D± pin, an ID pin, and a VBUS pin, and the USB receptacle includes a D± pin, an ID pin, and a VBUS pin, in order to enable communication between the portable device and a peripheral device connected to the cable assembly while charging the battery with a USB charger connected to the cable assembly. When the USB charger is connected, the cable assembly puts the ID pin into a ground state and outputs voltage to the VBUS pin. When the USB charger is removed, the cable assembly puts the ID pin into a floating state and stops outputting the voltage to the VBUS pin.

The portable device, the USB charger, and the peripheral device are connected to the cable assembly. When the portable device determines that the electric potential of the ID pin detected after a predetermined time has elapsed since the voltage was detected at the VBUS pin of the USB receptacle is in the ground state, the portable device charges the battery with the USB charger and performs USB communication with the peripheral device.

When the ID pin is in the ground state, the portable device acts as a host device to output voltage to the VBUS pin. According to the above structure, a collision between voltages on a VBUS line can be prevented regardless of the order of connections of the portable device and the USB charger to the cable assembly. For example, when the cable assembly with the USB charger connected is connected to the portable device, the portable device detects that the ID pin is in the ground state before detecting the voltage on the VBUS line output from the USB charger, so that no voltage is output to VBUS. Since the VBUS voltage is first detected to enable the charging of the battery with a VBUS power supply, no collision between voltages Occurs.

Furthermore, when the cable assembly is first connected to the portable device, the portable device does not output voltage to the VBUS pin as long as the ID pin is in the floating state. Therefore, even when the USB charger is then connected to the cable assembly, no collision between voltages occurs. The portable device may be a dual-role device that complies with USB_OTG specifications.

Furthermore, the USB charger may be removed and reconnected after the start of USB communication between the portable device and the peripheral device while supplying power from the USB charger to the VBUS line. In this case, however, when the USB charger is removed and hence the voltage on the VBUS line disappears, if the portable device is configured not to output voltage to the VBUS line as long as the ID pin is in the floating state, no collision between voltages will occur even when the USB charger is reconnected.

When the peripheral device is removed from the cable assembly, the USB charger can continue the charging of the battery. When the portable device determines that the electric potential of the ID pin detected after the predetermined time has elapsed since the voltage at the VBUS pin was detected is in the floating state, the portable device can charge the battery with a device connected to the USB receptacle. The device in this case can be any one of a DCP, a CDP, and an SDP.

When the device is determined to be a host computer corresponding to the SDP, the portable device acts as a B device to enable communication with the host computer while charging the battery with power supplied from the host computer through the VBUS line. When the portable device determines that the electric potential of the ID pin detected while not detecting voltage of a predetermined value or more at the VBUS pin is in the ground state, the portable device outputs voltage to the VBUS pin to enable USB communication with the peripheral device. At this time, the portable device acts as an A device.

According to an embodiment, a cable assembly is provided that enables a portable device to perform USB communication with another device while charging an internal battery through one receptacle.

Also, according to an embodiment, there can be provided a cable assembly that prevents a voltage collision from occurring on a VBUS line regardless of the order of connections.

Further, according to an embodiment, there can be provided a simply-structured cable assembly.

Further, according to an embodiment, there can be provided a cable assembly that can be realized without making any change to a USB controller of a portable device.

Furthermore, according to an embodiment, there can be provided a portable device operating in conjunction with such a cable assembly.

Furthermore, according to an embodiment, there can be provided a USB system composed of a portable device and a cable assembly, and a method for the portable device and a peripheral device to perform charging and communication at the same time in such a USB system.

The meanings of terms used in this specification follow the definitions of USB specifications unless otherwise particularly noted. The meanings of main terms used in this specification are as follow. A USB_OTG device (hereinafter called an OTG device) means a device equipped with a single micro-AB receptacle and capable of acting as either a host device or a peripheral device without changing the cable connection. Either a micro-A plug or a micro-B plug can be connected to the micro-AB receptacle.

When the micro-A plug is connected to the micro-AB receptacle, the OTG device acts as a host device (A device), while when the micro-B plug is connected, the OTG device acts as a peripheral device (B device). After the role is determined at the start of a session, the OTG device can change the role using an HNP (Host Negotiation Protocol) or an RSP (Role Swap Protocol). Even when the role is changed, a device first acting as the host device continues to supply power to VBUS.

Each of the micro-A plug and the micro-B plug means a plug with an ID pin added to pins of a standard USB plug. The ID pin of the micro-A plug is connected to a ground line (ground state), and the ID pin of the micro-B plug is in a floating state. In addition to a state of being connected directly to the ground, the ground state includes a state of being connected to the ground via a resistor. The A device means a device equipped with a standard-A receptacle and a device equipped with a micro-AB receptacle in which the micro-A plug is inserted. The A device supplies power to VBUS at the start of the session (a state of supplying power to VBUS) and acts as a host device.

The B device means a device equipped with a standard-B receptacle, a mini-B receptacle, or a micro-B receptacle, and a device equipped with a micro-AB receptacle in which a micro-B plug is inserted or no plug is inserted. The B device acts as a peripheral device without outputting voltage to the VBUS line at the start of the session. The host device means a device equipped with a CPU, a system memory, a bus, and the like as hardware in addition to a USB controller, and equipped with software such as an operating system and applications.

A USB charger is a USB DCP (Dedicated Charging Port) for charging a USB device through the VBUS line using a commercial power source or a DC power source as the source of power. A D± line of the USB charger is connected through a short circuit or a resistor. The A device also has the function of charging the B device, but the charging capacity thereof is limited by the USB specifications. In contrast, the charging capacity of the USB charger can be made larger than that of the A device.

In this specification, as a term that is not mentioned in the USB specifications, a plug which can be inserted into the micro-AB receptacle and in which the state of the ID pin can be externally controlled to get into either the floating state or the ground state is called a micro-AB plug. Further, a plug that includes an ID pin controlled the same way and can be inserted into a mini-AB receptacle is called a mini-AB plug. The USB connector is assumed to include the USB plug and the USB receptacle in both meanings of the term. The device is assumed to mean any one of the A device, the B device, the cable assembly, and the USB charger capable of being connected through the USB connector.

FIG. 1 is a diagram for describing a state in which a portable device 50 is connected with a USB charger 60 and a peripheral device 70 using a cable assembly 100. The cable assembly 100 includes a control block 101, a USB cable 103 to which a micro-AB plug 105 is connected, a USB cable 107 to which a USB 2.0 standard-A plug 109 is connected, and a USB 3.0 standard-A receptacle 111 attached to the control block 101.

The USB cable 103 includes a pair of UTP (Unshielded Twist Pair) cables for performing USB 2.0 communication, a power cable (VBUS), a ground cable (GND), two pairs of SDP (Shielded Differential Pair) cables for performing USB 3.0 communication, and a ground drain (GND) cable. The micro-AB plug 105, the standard-A plug 109, and the standard-A receptacle 111 constitute a physical interface of the cable assembly 100, which can connect the portable device 50, USB charger 60, and the peripheral device 70 at the same time, respectively.

Although the portable device 50 is an OTG device acting as both of the A device and the B device, it may be a host device acting only as the A device in the application of the present embodiment. The portable device 50 is equipped with a micro-AB receptacle 51 including an ID pin. Instead of the micro-AB receptacle, a mini-AB receptacle including the ID pin can also be adopted.

When the portable device 50 is equipped with only one micro-AB receptacle 51, use of the cable assembly 100 is most effective, but the portable device 50 may be equipped with two or more USB receptacles in the application of the present embodiment. The micro-AB plug 105 can take the form of a micro-A plug or a micro-B plug, but the state of the ID pin attributes to none of the micro-A plug and the micro-B plug based on the USB specifications because of being controlled by the control block 101.

Figure 2:
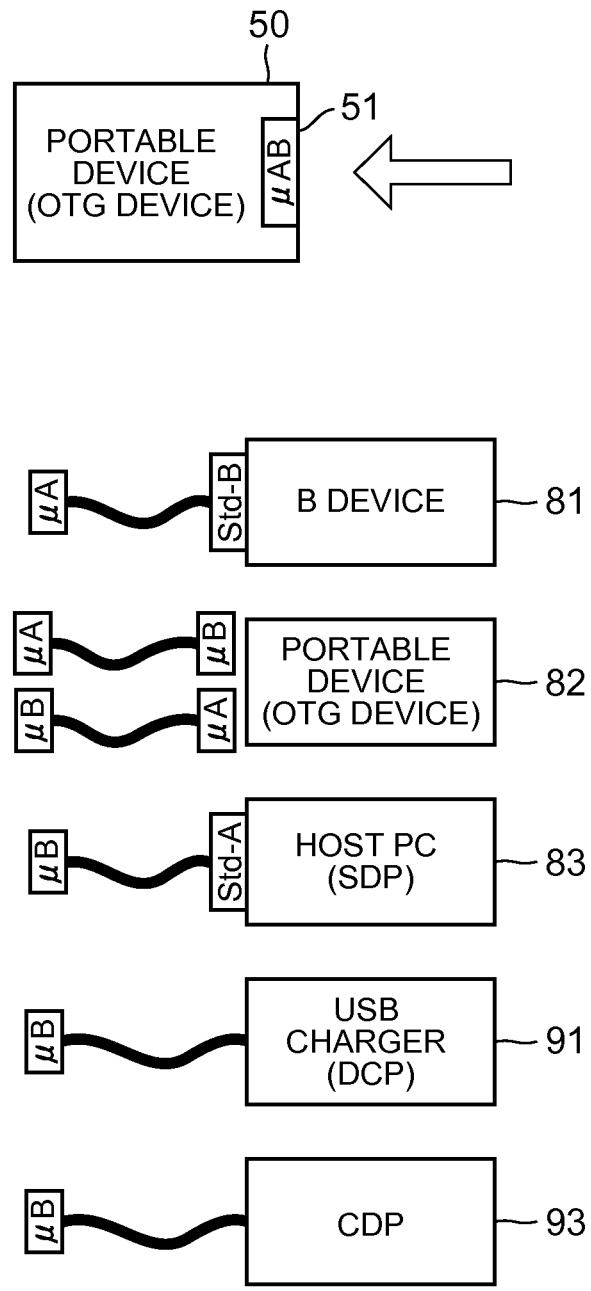
FIG. 2 is a diagram for describing an example of types of devices and plugs capable of being connected to a micro-AB receptacle.

The portable device 50 can connect another device to the micro-AB receptacle 51 instead of the cable assembly 100. FIG. 2 shows an example of devices and plugs capable of being directly connected to the micro-AB receptacle 51. B device 81 can be connected with the micro-A plug to enable the portable device 50 to act as the A device. A portable device 82 is an OTG device that can be connected to the portable device 50 through an OTG cable with a micro-A plug connected to one side and a micro-B plug connected to the other. When the portable device 50 and the portable device 82 are connected directly through the OTG cable, one device with the micro-A plug connected acts as the A device and the other device with the micro-B plug connected acts as the B device at the start of a session.

A host PC 83 is a laptop or desktop computer acting as a host device and is connected with the micro-B plug to make the portable device 50 act as the B device. The host PC 83 corresponds to an SDP (Standard Downstream Port) defined in the USB specifications. The host PC 83 can supply the VBUS line with up to 0.5 A or 0.9 A of current while communicating with the portable device 50. A USB charger 91 corresponds to a DCP (Dedicated Charging Port) defined in the USB specifications, which is connected with the micro-B plug to charge the portable device 50.

The USB charger 91 can also be connected to the portable device 50 through the micro-A plug. In this case, the portable device 50 with the micro-A plug connected acts as the A device to output voltage to the VBUS line while the USB charger 91 is not outputting voltage to the VBUS line. After that, when the USB charger 91 outputs voltage to the VBUS line, since a collision between voltages occurs, it is required to pay attention to the order of connections. The CDP (Charging Downstream Port) 93 corresponds to a USB communicable device capable of supplying larger current than the SDP. The CDP 93 is realized as a host PC or a hub, and connected with the micro-B plug to enable the supply of up to 1.5 A of current to the VBUS line as an example.

Returning to FIG. 1, the peripheral device 70 is the B device connectable to the standard-A receptacle 111 with the standard-A plug. The control block 101 can also employ a mini-A receptacle, a micro-A receptacle, or a micro-AB receptacle instead of the standard-A receptacle 111. As will become apparent later, the portable device 50 in the embodiment is configured to perform a special operation not to cause a collision between voltages on the VBUS line, while the peripheral device 70 is a normal device.

To that end, the host PC 83 acting as the A device to output voltage to the VBUS line is prevented from connecting to the control block 101 instead of the peripheral device 70. When the micro-AB receptacle is employed instead of the standard receptacle 111, the structure can be such that the micro-B plug side of the OTG cable is set for the portable device 82 and the micro-A plug side is set for the control block 101 to establish the connections. However, it is difficult for a user to pay special attention to the direction of the plug at the time of the connection. In the micro-ACA described above, a special scheme is also required in this point. Note that a cable with the standard-B plug connected instead of the standard-A receptacle may be connected directly to the control block 101.

As an example, the peripheral device 70 can be an audio device such as a headphone or a loudspeaker, an output device such as a printer or an external display, an input device such as a mouse or a keyboard, or a storage device such as a memory key or a disk drive. The peripheral device 70 may be either a self-powered device, which receives power from the USB cable through the VBUS line, but receives the supply of power for main operation from another power source such as an AC/DC adapter, or a bus-powered device operating with only power received from the VBUS line.

The USB charger 60 is a DCP having a similar structure to the USB charger 91, which can supply 1.5 A of current in one example. The cable assembly 100 can also employ, instead of the standard-A plug 109, any other kind of plug having a capacity capable of adapting to the USB charger 60. Alternatively, the cable assembly 100 can mount a receptacle for connecting the USB charger 60 to the control block 101.

Figure 3:
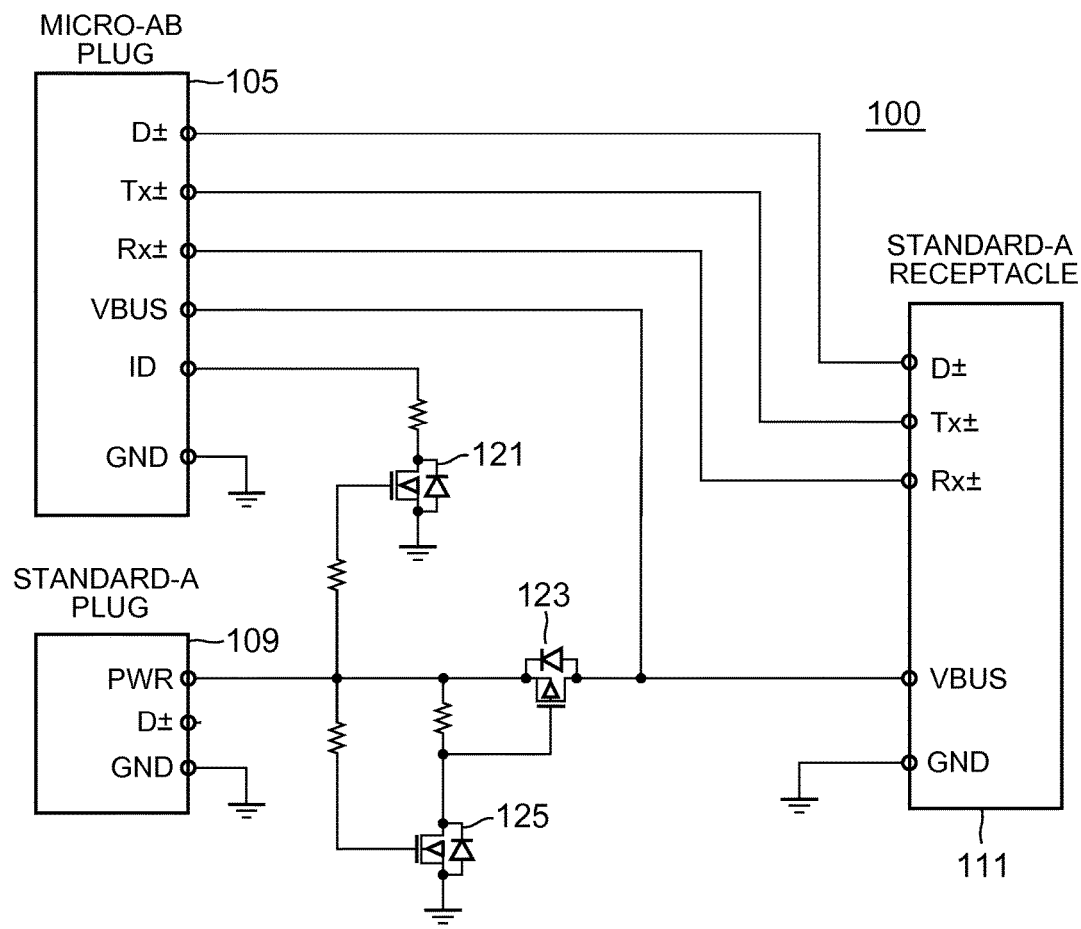
FIG. 3 is a circuit diagram of the cable assembly.

FIG. 3 is a circuit diagram of the cable assembly 100. The micro-AB plug 105 and the standard-A receptacle 111 are configured such that USB 2.0 signal pins (D±) and USB 3.0 signal pins (Tx±, Rx±) are connected directly to each other, respectively. Further, both VBUS pins are also connected directly to each other. The ID pin of the micro-AB plug 105 is connected to the ground through a resistor and an n-type MOS-FET 121. The ID pin may also be connected directly to the ground through the n-type MOS-FET 121.

A power (PWR) pin of the standard-A plug 109 is connected to the gate of the n-type MOS-FET 121, the gate of a p-type MOS-FET 123, and the gate of an n-type MOS-FET 125 through respective resistors, and further connected directly to the source of the p-type MOS-FET 123. The PWR pin is connected to the ground through a resistor and the n-type MOS-FET 125. The drain of the p-type MOS-FET 123 is connected to the VBUS pins of the micro-AB plug 105 and the standard-A receptacle 111. The D± pin of the standard-A plug 109 is connected to none of them.

Next, the operation of the cable assembly 100 will be described. While the USB charger 60 is not connected to the standard-A plug 109, the MOS-FETs 121 to 123 are in an off state. When the USB charger 60 is connected to the standard-A plug 109, the MOS-FETs 121 to 123 transition to an on state. After that, when the USB charger 60 is removed, the MOS-FETs 121 to 123 return to the off state. The USB charger 60 supplies VBUS power to the portable device 50 connected to the micro-AB plug 105 and the peripheral device connected to the standard-A receptacle 111.

Figure 4:
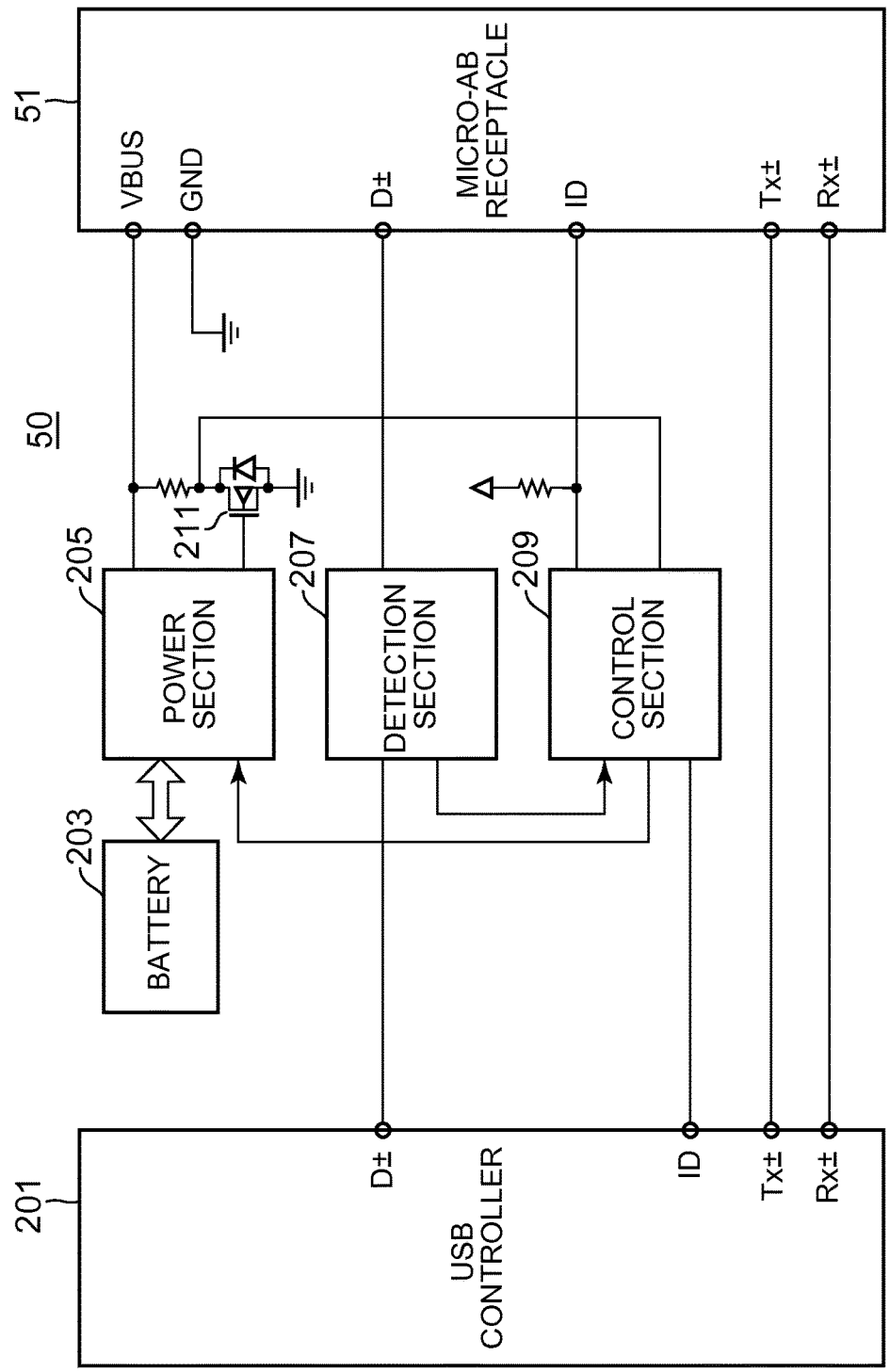
FIG. 4 is a circuit diagram of the portable device.

FIG. 4 is a circuit diagram of the portable device 50. FIG. 4 shows only a structure part necessary to understand the present embodiment. The portable device 50 includes a USB controller 201, a rechargeable battery 203, a power section 205, a detection section 207, a control section 209, and the micro-AB receptacle 51. The battery 203 supplies power to the USB controller 201, the power section 205, the detection section 207, and the control section 209 through the power section 205.

The USB controller 201 is formed by an SOC (System-on-a-chip) method together with a CPU, a system memory, an I/O control circuit, and the like. The USB controller 201 has a function as a controller of the host device and a function as a route hub. The USB controller 201 employs a dual-bus structure composed of a 2.0 physical layer for performing USB 2.0 communication and a 3.0 physical layer for performing USB 3.0 communication to support both specifications.

The power section 205, the detection section 207, and the control section 209 can be formed by hardware logic circuits including firmware outside of the SOC. Therefore, in the embodiment, there is no need to make a change to the USB controller 201 in order to connect to the cable assembly 100.

The VBUS pin of the micro-AB receptacle 51 is connected to the drain of an n-type MOS-FET 211 through the power section 205 and a resistor. The drain of the n-type MOS-FET 211 is connected to the control section 209. The source of the n-type MOS-FET 211 is connected to the ground, and the gate is connected to the power section 205.

The D± pin of the micro-AB receptacle 51 is connected to the detection section 207, and the ID pin is pulled up with a predetermined voltage and connected to the control section 209. The D± pin of the USB controller 201 is connected to the detection section 207. The control section 209 is connected to the detection section 207, the power section 205, and the ID pin of the USB controller 201. USB 3.0 signal pins (Tx±, Rx±) of the USB controller 201 and the micro-AB receptacle 51 are connected to each other.

The portable device 50 operates in any of three modes, i.e., a charging mode, a communication mode, and a charging/communication mode. The charging mode for charging the battery 203 includes a case of charging with the USB charger 60 or the USB charger 91 and a case of charging with the host PC 83. The communication mode includes a case where the portable device performs communication as the A device and a case where it performs communication as the B device, but the portable device may perform communication as only the A device. The charging/communication mode is an operating mode for performing charging and USB communication at the same time using the cable assembly 100.

At the time of the communication mode as the A device, the power section 205 increases the voltage of the battery 203 to a predetermined voltage to operate in an output mode for supplying power to the VBUS pin of the micro-AB receptacle 51. When the portable device 50 operates in the charging mode, the power section 205 operates in the charging mode to receive charging power from the VBUS pin of the micro-AB receptacle 51. When the host PC 83 supplies power to the VBUS pin, the portable device 50 operates in the communication mode as the B device.

When no voltage is supplied to the VBUS pin from outside, the power section 205 controls the n-type MOS-FET 211 in the on state. After voltage is applied to the VBUS pin, when the voltage is stabilized as a predetermined time passes, the power section 205 sends a signal to the gate of the n-type MOS-FET 211 to control the n-type MOS-FET 211 in the off state. The detection section 207 connects or disconnects the D± line between the USB controller 201 and the micro-AB receptacle 51 depending on the type of device connected to the micro-AB receptacle 51 regardless of the VBUS voltage and the electric potential of the ID line.

When recognizing, from the electric potential of the D± line, that the device connected to the micro-AB receptacle 51 is the USB charger 91, the detection section 207 asserts a control signal (H) to the control section 209. When recognizing, from the electric potential of the D± line, that a device capable of performing USB communication is connected to the micro-AB receptacle 51, the detection section 207 asserts a control signal (L) to the control section 209 and connects the D± pins of the USB controller 201 and the micro-AB receptacle 51.

The case where the detection section 207 asserts the control signal (L) corresponds to a case where the host PC 83, the cable assembly 100 with the USB charger 60 and the peripheral device 70 connected, the CDP 93, or the B device 81 is connected to the micro-AB receptacle 51. Based on the voltage at the VBUS pin and the electric potential of the ID pin, the control section 209 sets the power section 205 to the charging mode or the output mode. The control section 209 first makes sure to check the voltage at the VBUS pin at the start of a session.

When the voltage at the VBUS pin is higher than or equal to a predetermined value (in the case of H), the control section 209 outputs a charging signal for setting the power section 205 to the charging mode. When the voltage at the VBUS pin is lower than the predetermined value (in the case of L), the control section 209 outputs an output signal for setting the power section 205 to the output mode only in a case where the ID pin is in the ground state. Upon outputting the charging signal, when receiving the control signal (H) from the detection section 207, the control section 209 sets, as an example, 1.5 A of sink current in the power section 205, while when receiving the control signal (L), the control section 209 sets 0.5 A, 0.9 A, or 1.5 A of sink current.

Figure 5:
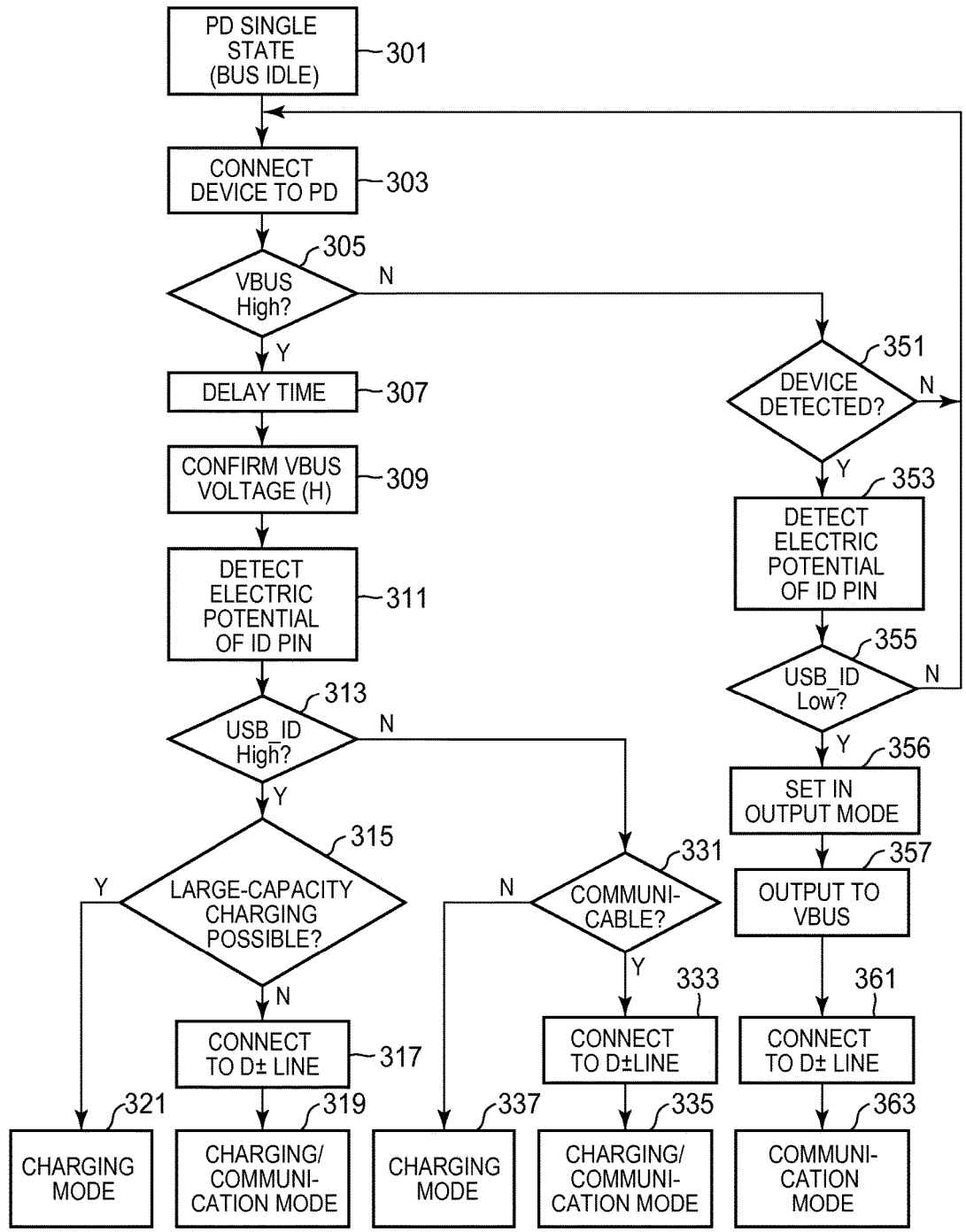
FIG. 5 is a flowchart for describing the operation of the portable device and the cable assembly.
Figure 6:
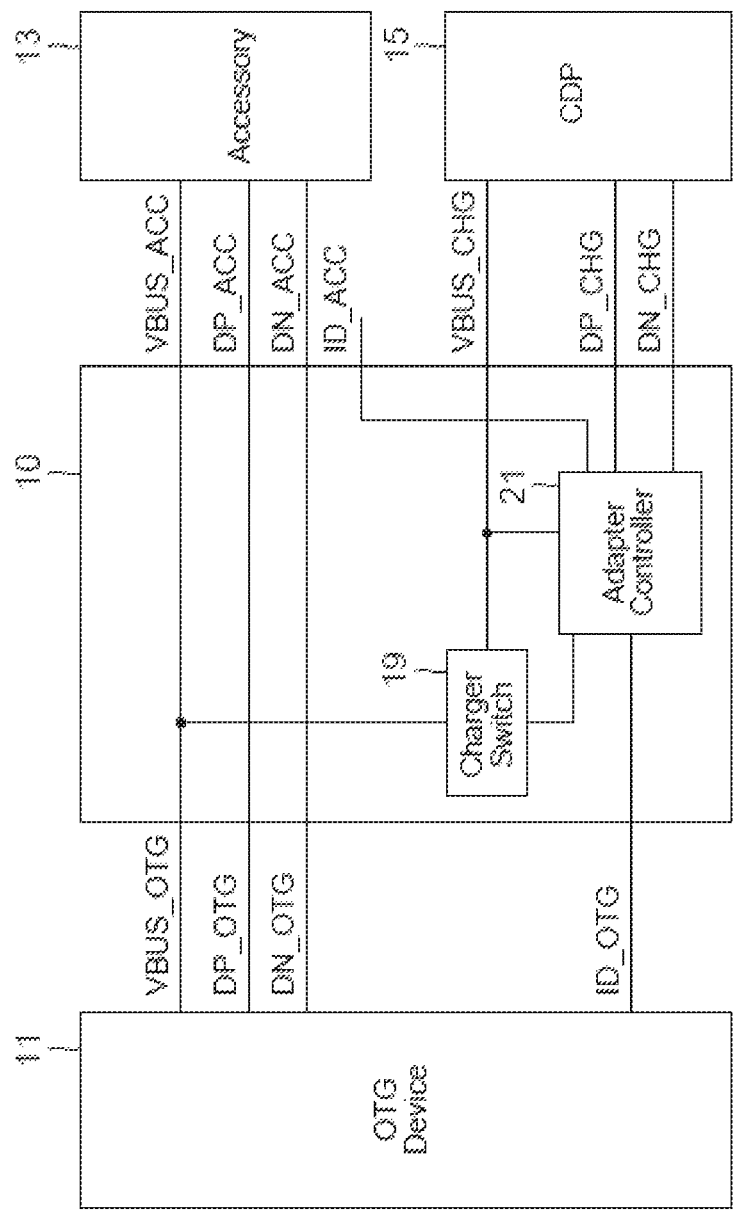
FIG. 6 is a diagram for describing a micro-ACA defined in USB specifications.

Next, the operation of the portable device 50 and the cable assembly 100 when the cable assembly 100, the USB charger 60, and the peripheral device 70 or any one of the devices shown in FIG. 2 are connected to the portable device 50 will be described with reference to a flowchart of FIG. 5. In block 301, the portable device 50 is powered on but none of the devices is connected to the micro-AB receptacle 51.

The USB controller 201 detects that no data communication is performed, and stops all transceivers to transition to an idle state. At this time, the power section 205 does not output voltage to the VBUS line. Further, the power section 205 is setting the n-type MOS-FET 211 in the on state and pulling down the VBUS line with a predetermined resistance value. The detection section 207 is cutting off the D± line between the USB controller 201 and the micro-AB receptacle 51. Note that block 301 includes a state (single state) of the cable assembly 100 without connecting the USB charger 60 and the peripheral device 70 to the micro-AB receptacle 51 and a state of connecting the cable assembly 100 with only the peripheral device 70 connected.

In block 303, any of the devices is connected to the micro-AB receptacle 51. Block 305 shows a state of voltage at the VBUS pin of the micro-AB receptacle 51. When the voltage is higher than or equal to the predetermined value (in the case of H), the procedure proceeds to block 307, while when the voltage is less than the predetermined value (in the case of L), the procedure proceeds to block 351. Proceeding to block 307 means that either the cable assembly 100 to which any one of the laptop PC 83, the USB charger 91, and the CDP 93 shown in FIG. 2, and the USB charger 60 are connected, or the cable assembly 100 with the USB charger 60 and the peripheral device 70 connected is connected to the micro-AB receptacle 51. Proceeding to block 351 means that a device that outputs no voltage to the VBUS line is connected to the micro-AB receptacle 51.

In an embodiment, such a device corresponds to the B device 81, the cable assembly 100 in the single state, or the cable assembly 100 with only the peripheral device 70 connected. In block 307, as an example, a delay time of 200 milliseconds or more passes from when the voltage on the VBUS line detected by the power section 205 exceeds a predetermined value until the voltage is stabilized. The delay time is significant for the control section 209 to detect that the electric potential of the ID pin is in the ground state before detecting the voltage on the VBUS line and output the output signal in order to prevent the power section 205 from outputting voltage to the VBUS pin.

Therefore, a delay time longer than the time required to stabilize the voltage may be set as necessary. In block 309, when the delay time passes and the voltage is stabilized, the power section 205 puts the n-type MOS-FET into the off state. As a result, the control section 209 detects that voltage higher than or equal to the predetermined value is generated on the VBUS line. In block 311, the control section 209 that checked the voltage on the VBUS line then checks the electric potential of the ID pin. When the electric potential of the ID pin is in the floating state, the procedure proceeds from block 313 to block 315, while when it is in the ground state, the procedure proceeds to block 331.

When proceeding to block 315, it means that any one of the host PC 83, the USB charger 91, and the CDP 93 is connected directly to the micro-AB receptacle 51. Since each of these devices is connected with the micro-B plug, the portable device 50 recognizes itself as the B device. When proceeding to block 331, it means that the cable assembly 100 with the USB charger 60 connected or the cable assembly 100 with the USB charger 60 and the peripheral device 70 connected is connected to the micro-AB receptacle 51.

At this time, since the electric potential of the ID pin is in the ground state, the portable device 50 recognizes itself as the A device. However, since the control section 209 recognizes that voltage is supplied through the VBUS pin of the micro-AB receptacle 51, the power section 205 is not set in the output mode. In both the case where the ID pin is in the ground state and the case where the ID pin is in the floating state, the control section 209 sends the charging signal to the power section 205. Further, the control section 209 sets, in the power section 205, a value of sink current received through the VBUS pin according to the following procedure: In block 315, when the detection section 207 determines, from the electric potential of the D± line, that the USB charger 91 is connected to the micro-AB receptacle 51 to assert the control signal (H), the procedure proceeds to block 321.

In block 321, when the control section 209 sends the charging signal to the power section 205, the portable device 50 transitions to the charging mode. At this time, the control section 209 sets, as an example, 1.5 A of sink current in the power section 205. In block 315, when the detection section 207 determines, from the electric potential of the D± line, that the host PC 83 or the CDP 93 is connected to assert the control signal (L), the procedure proceeds to block 317.

In block 317, when the detection section 207 connects the USB controller 201 to the D± pin of the micro-AB receptacle 51, the portable device 50 acts as the B device. The host PC 83 or the CDP 93 starts an enumeration process for the portable device 50 to start USB communication. At this time, the VBUS power is supplied from the host PC 83 or the CDP 93. In block 319, when the control section 209 sends the charging signal to the power section 205, the portable device 50 transitions to the charging/communication mode to act as the B device. At this time, the control section 209 sets, in the power section 205, 0.5 A, 0.9 A, or 1.5 A of sink current as defined in the USB specifications. Note that the procedure block 317 can be so skipped that the detection section 207 will prevent the portable device 50 and the host PC 83 from communicating with each other.

In block 331, when the detection section 207 determines, from the electric potential of the D± line, that the cable assembly 100 with the USB charger 60 connected is connected to the micro-AB receptacle 51 to assert the control signal (H), the procedure proceeds to block 337. In block 337, when the control section 209 sends the charging signal to the power section 205, the portable device 50 transitions to the charging mode. At this time, the control section 209 sets, as an example, 1.5 A of sink current in the power section 205. In block 331, when the detection section 207 determines, from the electric potential of the D± line, that the cable assembly 100 with the USB charger 60 and the peripheral device 70 connected is connected to assert the control signal (L), the procedure proceeds to block 333.

In block 333, when the detection section 207 connects the D± line, the portable device 50 acts as the A device. In block 335, when the control section 209 sends the charging signal to the power section 205, the portable device 50 transitions to the charging/communication mode to act as the A device. Note that, since the control section 209 does not set the power section 205 to the output mode, the power section 205 does not output voltage to the VBUS line. The voltage on the VBUS line is supplied from the USB charger 60. At this time, the control section 209 sets, as an example, 1.5 A of sink current in the power section 205. After that, the portable device 50 starts an enumeration process for the peripheral device 70 to start USB communication.

In the state of block 335, when the USB charger 60 is removed from the cable assembly 100, since the power on the VBUS line is stopped and the peripheral device 70 acting as the B device does not output the VBUS power as well, the USB communication is stopped. When the USB charger 60 is removed, the ID pin of the micro-AB plug 105 transitions to the floating state. In this case, when the VBUS voltage is less than the predetermined value, the power section 205 does not supply voltage to VBUS as well in the procedure block 355. However, if the USB charger 60 is connected again, the USB communication can be resumed.

In block 351, the detection section 207 determines, from the electric potential of the D± line, whether any communicable device is connected. When no communicable device is connected, since it means a state where the cable assembly 100 in the single state is connected, a state where none of the devices is connected, or a state where only the OTG cable is connected, the procedure returns to block 303. The detection section 207 that determined that a communicable device is connected asserts the control signal (L) to the control section 209. When the control signal (L) is asserted, it means a state where the B device 81 is directly connected or a state where the cable assembly 100 with only the peripheral device 70 connected is connected.

In block 353, the control section 209 checks the electric potential of the ID pin of the micro-AB receptacle 51. When the electric potential of the ID pin is in the floating state, since it means that the cable assembly 100 with only the peripheral device 70 connected is connected, the procedure returns to block 303. Thus, when connecting to the portable device 50 using the cable assembly 100, the peripheral device 70 cannot perform USB communication unless the USB charger 60 is connected. When the electric potential of the ID line is in the ground state, since it means that the B device 81 is directly connected, the procedure proceeds to block 356. In block 356, the control section 209 sends the output signal to set the power section 205 to the output mode.

In block 357, the power section 205 increases the voltage of the battery 203, and outputs the increased voltage to the VBUS line. Since the B device 81 does not supply voltage to the VBUS line, no collision between voltages occurs. In block 361, when the detection section 207 connects the USB controller 201 with the D± line of the micro-AB receptacle 51, the portable device 50 acts as the A device to transition to the communication mode in block 363, starting USB communication. At this time, the portable device 50 makes an enumeration for the B device 81.

The order of respective blocks described in the above procedure is not intended to limit the present embodiment. Replacing the order to fulfill an equivalent function in the scope predictable by those skilled in the art shall be included in the scope of the present embodiment. According to the above procedure, the portable device 50 can communicate with the peripheral device 70 while charging the battery 203 with the USB charger 60 using the cable assembly 100. The power of the VBUS line at this time is supplied from the USB charger 60.

When the USB charger 60 is not connected, the cable assembly 100 controls the ID line in the floating state corresponding to the B plug, while when the USB charger 60 is connected, the cable assembly 100 controls the ID line in the ground state corresponding to the A plug. When any device is connected with the micro-A plug, the portable device 50 acts as the A device to output power to VBUS.

When the cable assembly 100 with the USB charger 60 connected is connected to the micro-AB receptacle 51, the portable device 50 detects VBUS voltage before detecting the electric potential of the ID pin. When the voltage on the VBUS line is higher than or equal to the predetermined value (in the case of H), even if the electric potential of the ID line detected after that is in the ground state, the power section 205 does not output voltage to the VBUS pin in the procedure block 313. Thus, since the portable device 50 does not supply power to the VBUS line while acting as the A device, a collision between voltages on the VBUS line can be prevented.

There is a case where the peripheral device 70 is first connected to the cable assembly 100 connected to the portable device 50, and then the USB charger 60 is connected. Since the ID line of the cable assembly 100 is in the floating state before the USB charger 60 is connected, the portable device does not output voltage to the VBUS line. Therefore, even when the USB charger is connected after that, no collision between voltages on the VBUS line occurs.

The portable device 50 supplies power to the VBUS line in block 357 only when any other device does not supply power to the VBUS line of the micro-AB receptacle 51 in block 305 to operate in the communication mode. Therefore, the voltage of the portable device 50 and the voltage of the USB charger 60 never collide with each other regardless of the order of connections of the cable assembly 100 and the USB charger 60 to the portable device 50.

The above embodiment can be easily realized without modifying the USB controller 201 while simplifying the structure of the cable assembly 100. Moreover, even when any device other than the cable assembly 100 is connected to the micro-AB receptacle 51, the portable device 50 can act as the A device or the B device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
   a portable device having a receptacle; and a cable assembly including a plug connectable to the receptacle;

the cable assembly including:
  a first connection for a peripheral device allowing data communication between the peripheral device and the portable device, wherein the first connection comprises an ID pin;
  a second connection for a charger allowing charging of the portable device from the charger, wherein the second connection comprises an ID pin; and
  a control section that indicates a charging mode to the portable device permitting connection of both the charger and the peripheral device to the portable device in any order without any voltage collisions on the cable assembly while allowing the data communication and the charging, wherein the connection in any order is permitted based upon a state of the ID pin of the first connection and a state of the ID pin of the second connection.

2. The system according to claim 1, wherein, when the cable assembly is connected to the charger and the portable device, the cable assembly indicates to the portable device that no voltage is to be output on a predetermined line.

3. The system according to claim 2, wherein, when the cable assembly is connected to the portable device without the charger being connected to the cable assembly, the cable assembly indicates to the portable device that no voltage is to be output on the predetermined line.

4. The system according to claim 1, wherein the portable device is a dual-role device.

5. The system according to claim 1, wherein, when it is determined that the charger is connected to the second connection, the control section sets the charging mode with a predetermined current value.

6. The system according to claim 1, wherein when a peripheral device that does not output voltage is connected to the cable assembly, the control section sets the power section to an output mode.

7. The system according to claim 1, wherein the cable assembly indicates a charging mode to the portable device in response to connection of the charger.

8. A cable assembly, comprising: a first connection for a peripheral device allowing data communication between the peripheral device and the portable device, wherein the first connection comprises an ID pin;
  a second connection for a charger allowing charging of the portable device from the charger, wherein the second connection comprises an ID pin; and
  a control section that indicates a charging mode to a portable device permitting connection of both the charger and the peripheral device to the portable device in any order without any voltage collisions on the cable assembly while allowing the data communication and the charging, wherein the connection in any order is permitted based upon a state of the ID pin of the first connection and a state of the ID pin of the second connection.

9. The cable assembly according to claim 8, wherein, when the cable assembly is connected to the charger and the portable device, the cable assembly indicates to the portable device that no voltage is to be output on a predetermined line.

10. The cable assembly according to claim 9, wherein, when the cable assembly is connected to the portable device without the charger being connected to the cable assembly, the cable assembly indicates to the portable device that no voltage is to be output on the predetermined line.

11. The cable assembly according to claim 8, wherein the portable device is a dual-role device.

12. The cable assembly according to claim 8, wherein, when the charger is connected to the second connection, the cable assembly sets the charging mode with a predetermined current value.

13. The cable assembly according to claim 8, wherein when a peripheral device that does not output voltage is connected to the cable assembly, the cable assembly is set to an output mode.

14. The cable assembly according to claim 8, wherein the cable assembly indicates a charging mode to the portable device in response to connection of the charger.

15. A method, comprising:
  detecting, at a cable assembly, connection of a portable device; and
  indicating, using the cable assembly, a charging mode to the portable device permitting connection, to the portable device, of both a charger that charges the portable device and a peripheral device that communicates data to the portable device via the cable assembly in any order without any voltage collisions on the cable assembly while allowing the data communication and the charging, wherein the indicating comprises identifying a state of an ID pin of a first connector of the cable assembly for the charger and a state of an ID pin of a second connector of the cable assembly for the peripheral device.

16. The method according to claim 15, wherein the indicating comprises, when the cable assembly is connected to the charger and the portable device, indicating to the portable device that no voltage is to be output on a predetermined line.

17. The method according to claim 16, wherein the indicating comprises, when the cable assembly is connected to the portable device without the charger being connected to the cable assembly, indicating to the portable device that no voltage is to be output on the predetermined line.

18. The method according to claim 15, wherein the portable device is a dual-role device.

19. The method according to claim 15, wherein the indicating comprises, when a peripheral device that does not output voltage is connected to the cable assembly, setting the cable assembly to an output mode.

20. The method according to claim 15, wherein the indicating comprises:
  when the charger is connected to the cable assembly, putting an ID pin into a ground state and outputting voltage to the portable device at a VBUS pin;
  putting, when the charger is removed from the cable assembly, the ID pin into a floating state; and
  determining that the portable device, the charger, and the peripheral device are connected to the cable assembly in any order; and
  responsive to the determining, permitting charging of a battery of the portable device with the charger and a communication between the portable device and the peripheral device.

* * * * *